(12) United States Patent
Friedrich et al.

(10) Patent No.: US 9,291,303 B2
(45) Date of Patent: Mar. 22, 2016

(54) METHOD OF FASTENING AND ADJUSTING A LIGHT GRID HOUSING

(71) Applicant: SICK AG, Waldkirch (DE)

(72) Inventors: Ralf Friedrich, Waldkirch (DE);
Christof J. Meyer, Waldkirch (DE);
Christian Klingelhofer, Waldkirch (DE)

(73) Assignee: SICK AG, Waldkirch (DE)

( * ) Notice: Subject to any disclaimer, the term of this patent is extended or adjusted under 35 U.S.C. 154(b) by 122 days.

(21) Appl. No.: 14/017,665

(22) Filed: Sep. 4, 2013

(65) Prior Publication Data

US 2014/0064825 A1 Mar. 6, 2014

(30) Foreign Application Priority Data

Sep. 5, 2012 (DE) .......................... 10 2012 108 262

(51) Int. Cl.
| | |
|---|---|
| *F16M 13/02* | (2006.01) |
| *B21D 39/00* | (2006.01) |
| *G01V 8/10* | (2006.01) |
| *F21V 21/04* | (2006.01) |
| *F16B 3/00* | (2006.01) |

(52) U.S. Cl.
CPC .............. *F16M 13/02* (2013.01); *B21D 39/00* (2013.01); *G01V 8/10* (2013.01); *F16B 3/00* (2013.01); *F21V 21/042* (2013.01); *Y10T 24/1441* (2015.01); *Y10T 29/49826* (2015.01); *Y10T 29/49948* (2015.01); *Y10T 403/20* (2015.01)

(58) Field of Classification Search
CPC ................... Y10T 29/49963; Y10T 29/49948; Y10T 24/1441; Y10T 24/44974; F21V 21/042; F21V 21/00; B21D 39/00; F16M 13/02

See application file for complete search history.

(56) References Cited

U.S. PATENT DOCUMENTS

| | | | | |
|---|---|---|---|---|
| 2,934,803 | A | * | 5/1960 | Allen ............................ 403/245 |
| 2002/0190166 | A1 | | 12/2002 | Bagdi |
| 2003/0106992 | A1 | | 6/2003 | Koyama et al. |
| 2004/0206869 | A1 | | 10/2004 | Elmer |
| 2007/0041833 | A1 | * | 2/2007 | Dupin et al. ................ 415/214.1 |

FOREIGN PATENT DOCUMENTS

| | | |
|---|---|---|
| DE | 25 56 459 A1 | 6/1976 |
| DE | 198 17 710 A1 | 10/1999 |
| DE | 20111588 U1 | 12/2001 |

(Continued)

OTHER PUBLICATIONS

German Office Action in the counterpart Application No. 10 2012 108 262.6, dated Jun. 14, 2013, five (5) pages.

*Primary Examiner* — Jermie Cozart

(74) *Attorney, Agent, or Firm* — Nath, Goldberg & Meyer; Jerald L. Meyer; Leonid D. Thenor

(57) ABSTRACT

A fastening apparatus having a base part (4) for fastening and/or adjusting a light grid housing (1) having a partly round housing cross-section (34) in a housing section at an assembly body (12), wherein the base part (4) has an open receiver (24) for the light grid housing (1), wherein the receiver (24) forms a circular section (30) in cross-section and the circular section (30) has an angle (α) of more than 180 degrees, wherein the receiver (24) of the base part (4) is slightly smaller than the partly round housing cross-section (34) of the housing section, wherein the light grid housing (1) is arranged in the receiver (24) and is held by the receiver (24) by force transmission.

5 Claims, 5 Drawing Sheets

(56) References Cited

FOREIGN PATENT DOCUMENTS

Figure 1:
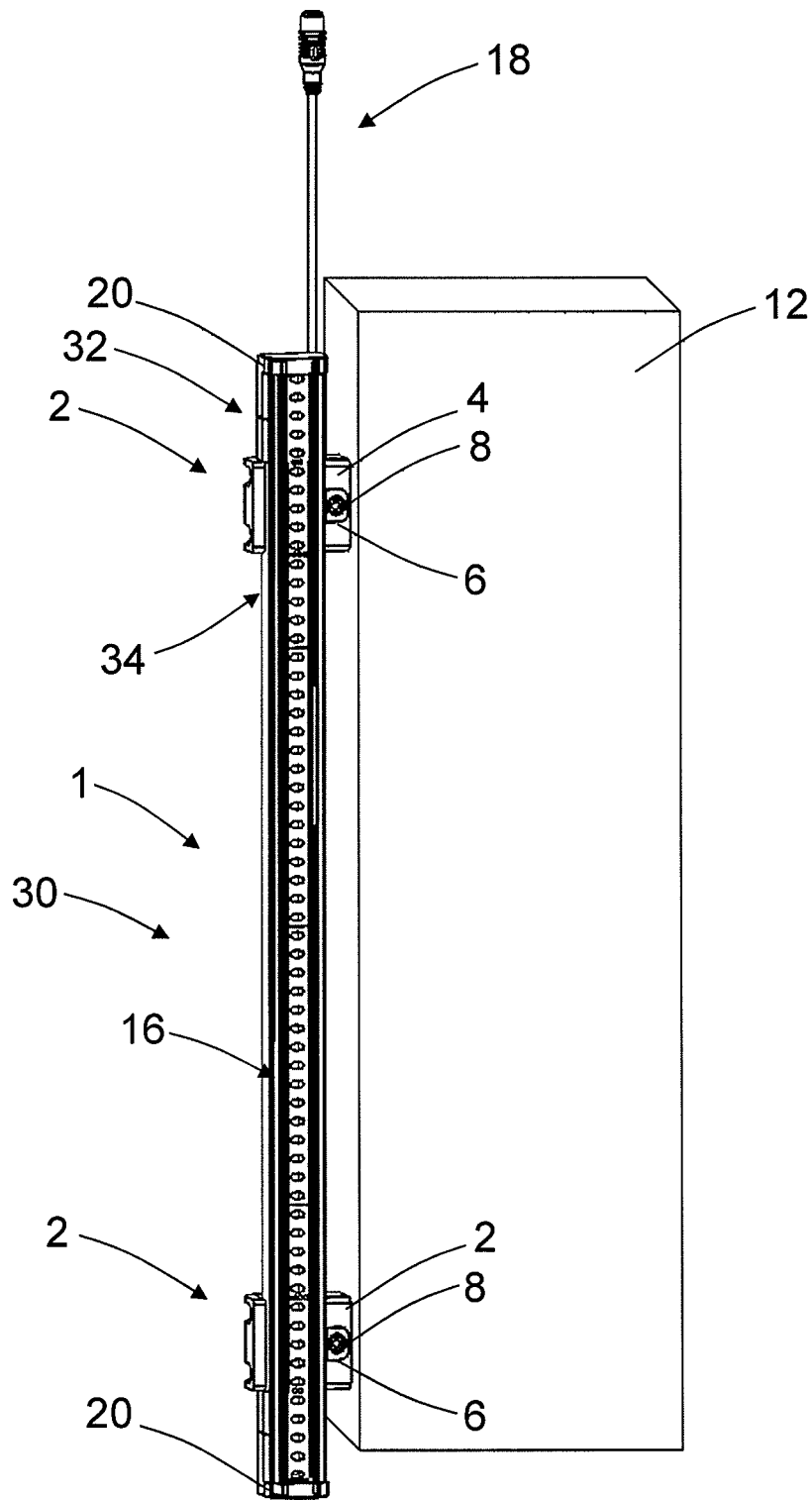

| DE | 202007005332 U1 | 7/2007 |
| DE | 10 2006 009 115 A1 | 8/2007 |
| DE | 10 2006 053 003 B4 | 4/2010 |
| DE | 102011050896 A1 | 12/2012 |
| EP | 1111249 A2 | 6/2001 |
| KR | 1020110097660 A | 8/2011 |

* cited by examiner

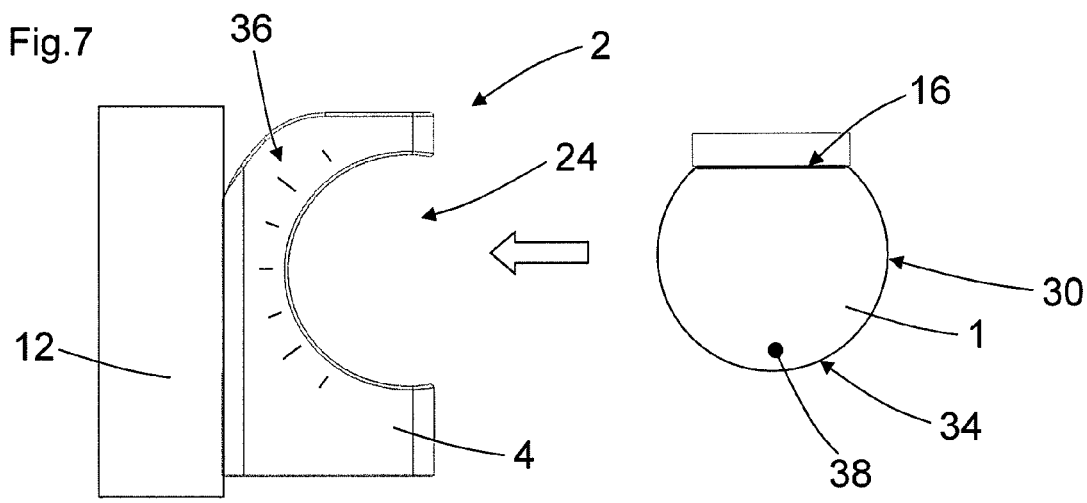
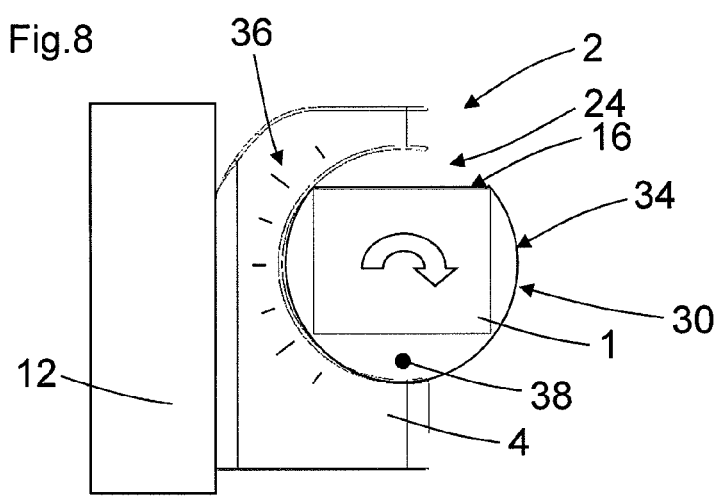
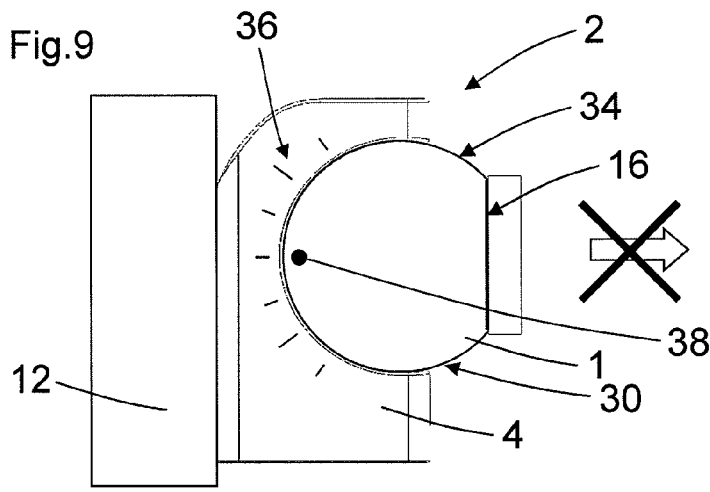

METHOD OF FASTENING AND ADJUSTING A LIGHT GRID HOUSING

The present invention relates to a fastening apparatus for a light grid housing.

DE 10 2006 053 003 B4 relates to a fastening apparatus for a light grid whose components are integrated in at least one housing. The fastening apparatus comprises a rotary holder having at least one ring-shaped fastening element. At least segments of the edges of the at least one housing of the light grid have rounded portions. They form a receiver for the fastening element such that, when the housing is fixed to the rotary holder, the inner wall of the ring-shaped fastening element directly contacts the rounded portions.

DE 10 2006 009 115 A1 relates to a clamping apparatus having a clamping hoop and a clamping foot for fastening and adjusting an optoelectronic sensor, in particular a light grid, at a fastening bar. Provision is made for this purpose that a clamping screw, which passes through the sensor and the clamping foot, engages into a thread at the end side of the clamping hoop facing the clamping foot. The clamping hoop which engages at least slightly more on the side disposed opposite the clamping foot than centrally is thereby drawn into the clamping foot with the clamping screw so that the clamping hoop connected the sensor in a force-transmitting manner to the fastening bar while cooperating with the clamping foot.

DE 198 17 710 A1 discloses a pedal arm, for example for a brake pedal. The pedal arm has a pipe piece having two oppositely disposed flattened portions. The pipe piece can be introduced via these flattened portions into a slide bearing via an opening whose width corresponds to the spacing of the flattened portions.

DE 25 56 459 A1 relates to a joint apparatus for doors of cupboards. In this respect, the door has a cut-out having a circular section and an opening which is smaller than the circular cross-section and has parallel sides. A part is introduced into this opening which is flattened on two sides and which is fixed in the opening by a nose by rotating by 90°.

It is the underlying object of the invention to provide an improved fastening possibility for light grid housings which manages with a few individual parts as possible, which allows the light grid housing to be fastened to the short-side ends directly adjacent to neighboring parts and the fastening direction of the fastening apparatus can be chosen.

The object is satisfied by a fastening apparatus having a base part for fastening and/or adjusting a light grid housing having a partly round housing cross-section in a housing section in an assembly body, wherein the base part has an open receiver for the light grid housing, wherein the receiver forms a circular section in cross-section and the circular section has an angle of more than 180 degrees, wherein the receiver of the base part is slightly smaller than the partly round housing cross-section of the housing section, wherein the light grid housing is arranged in the receiver and is held by the receiver by force transmission.

The object is furthermore satisfied by a method of fastening and/or adjusting a light grid housing having a partly round housing cross-section in a housing section having a base part at an assembly body, wherein the base part receives the light grid housing by means of an open receiver, wherein the receiver forms a circular section in cross-section and the circular section has an angle of more than 180 degrees, wherein the light grid housing is arranged in the receiver in that the light grid housing is introduced into the receiver of the base part in a first orientation and is rotated by 90° in the receiver, wherein the receiver of the base part is slightly smaller than the partly round housing cross-section of the housing section and is held by the receiver by force transmission.

The light grid housing can first be held by the fastening apparatus without additional tools or further fastening means being necessary.

The light grid has a partly round housing section, wherein the housing section is flat in the region of a front screen, whereby a partly round housing cross-section is formed at least in one housing section.

The light grid housing is first pushed into the base part laterally so that the front screen, that is the flat part of the light grid housing, faces toward the side. As soon as the light grid housing is located in the open receiver, the light grid housing is rotated by 90 degrees along a longitudinal axis so that the front screen faces away from the base part. The light grid with the partly round housing section is rotated in the open receiver of the base part by this movement. The open receiver of the base part is in this respect slightly smaller so that the light grid housing is held in the base part by force transmission. Since the open receiver of the base part has a circular section with an angle of more than 180 degrees in cross-section, the light grid housing can only be pushed into the base part rotated by 90° and can also no longer be released or fall out directly in the direction of the opening of the base part after a rotation by approximately 90 degrees, whereby a shape matching is formed. The light grid housing is thereby first held solely by the base part by force transmission. The open receiver having a circular section with an angle of more than 180 degrees in particular has an angle of less than 210 degrees and in particular less than 235 degrees, depending on how large the flattened part of the light grid housing is formed by the front screen.

In this position, the light grid can now be rotated about the longitudinal axis at an angle of approximately +/−15 degrees to align the light grid. In this respect, for example, the force transmission is overcome by the naked hand to rotate the light grid. During this adjustment, the light grid housing is further held by force transmission in any desired rotated position so that an adjustment can be checked.

The base part itself is fastened by screws or other fastening means to an assembly body, for example a machine frame or the like. The base part itself does not have to be released from the assembly body for fastening or releasing the light grid housing. The base part remains fastened to the assembly body so that the position of the light grid housing is fixed. The light grid housing is therefore already preadjusted on a change in its position.

A clamping part is advantageously fastened to the base part by means of a screw. The clamping part is arranged at a side of the open receiver of the base part and is connected to the base part via a screw. The clamping part has a slanted surface at its lower side which faces toward the base part. The slanted surface is configured such that the clamping part is shorter at the side toward the open receiver than the side disposed opposite it. The clamping part is thereby tilted on the screwing into the base part in the direction of the open receiver and thus in the direction of the light grid housing so that the light grid housing is clamped in the base part by the clamping part. The light grid housing can thereby be finally positioned in its end position in the base part after the light grid housing has been adjusted. In accordance with the invention, the fastening apparatus comprises, except for fastening screws, only two parts, namely the base part and the clamping part.

In a further development of the invention, the base part has fastening openings which are perpendicular to one another and which each allow an alternative fastening of the base part to the assembly body, wherein the assembly of the base part can take place in a respective one of the two mutually perpendicular directions. The base part can thereby be connected to the assembly body at a first side, or alternatively at a second side perpendicular thereto. The position of the base part is thereby flexibly selectable at an assembly body. The fastening apparatus can thereby be used flexibly. The fastening openings serve for receiving fastening screws or other fastening means.

In a further development of the invention, the light grid has a rectangular region sectionally, preferably at the end regions of the longitudinal light grid housing, which rectangular region forms an abutment and/or a position mark for the base part in the longitudinal direction at the light grid. Even if the light grid housing should start to slip despite the force transmission between the base part and the light grid housing on a perpendicular assembly, it is prevented by the rectangular region that the light grid slides out of the base part since the rectangular region serves as an abutment. The rectangular region can furthermore serve as a position mark, whereby the light grid housing is fixed in its position along its longitudinal axis.

In accordance with a preferred embodiment, an angle scale is arranged at an end face of the base part. A specific rotary position, set to a specific angle at the angle scale, can be read off with the aid of a position mark at the light grid housing and can be set exactly again at any time, for example on a replacement of the light grid housing.

In accordance with a preferred embodiment, the base part and/or the clamping part comprise polypthhalamide, abbreviation PPA, having a glass fiber portion of 20% to 40%, in particular 30%. Polyphthalamides have a high heat resistance and a good dimensional stability with only slight distortion. Furthermore, they have a high tensile strength, stiffness and notch impact strength. Polypththalamide is accordingly an inexpensive alternative to a design of metal.

Figure 2:
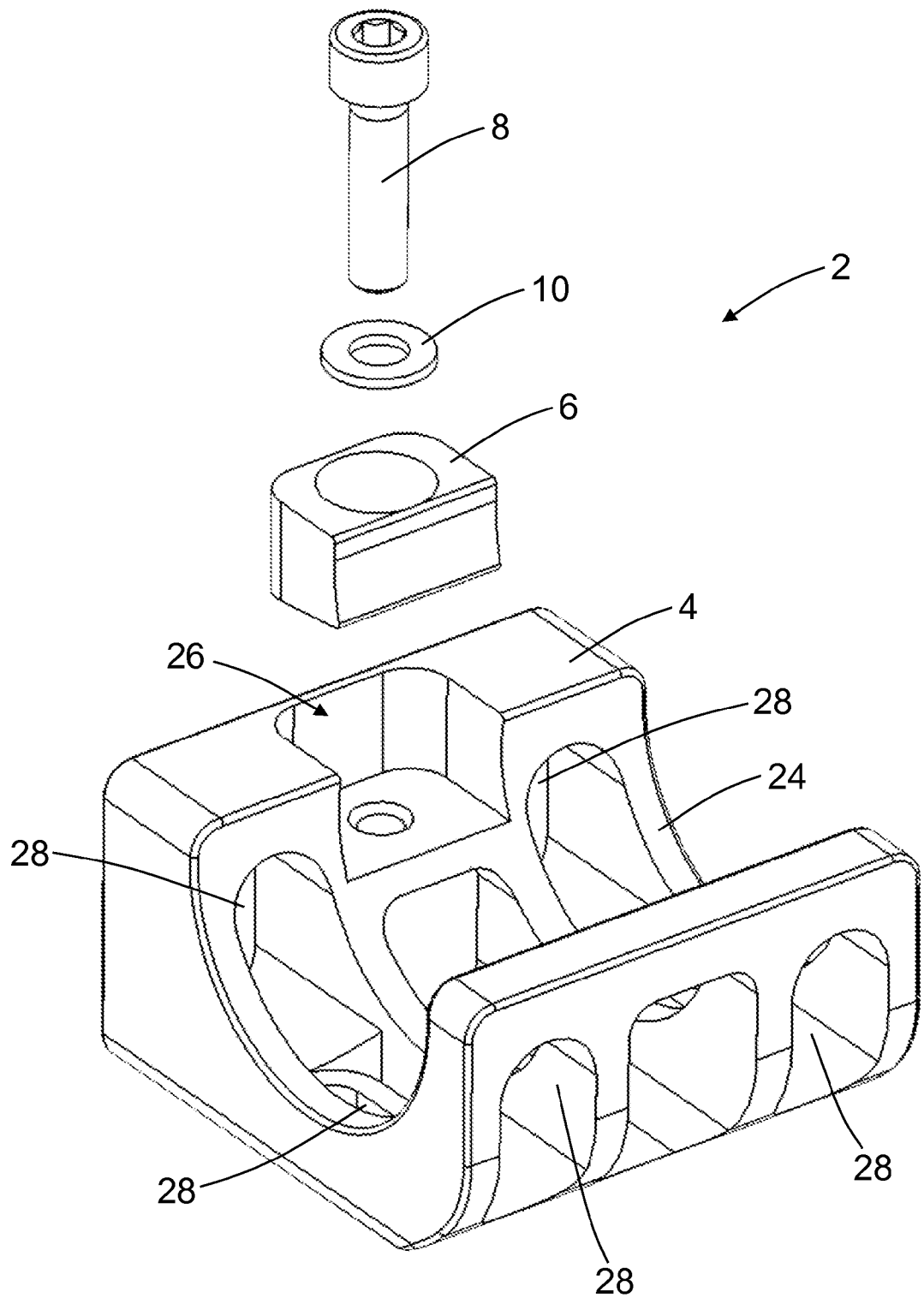
Figure 3:
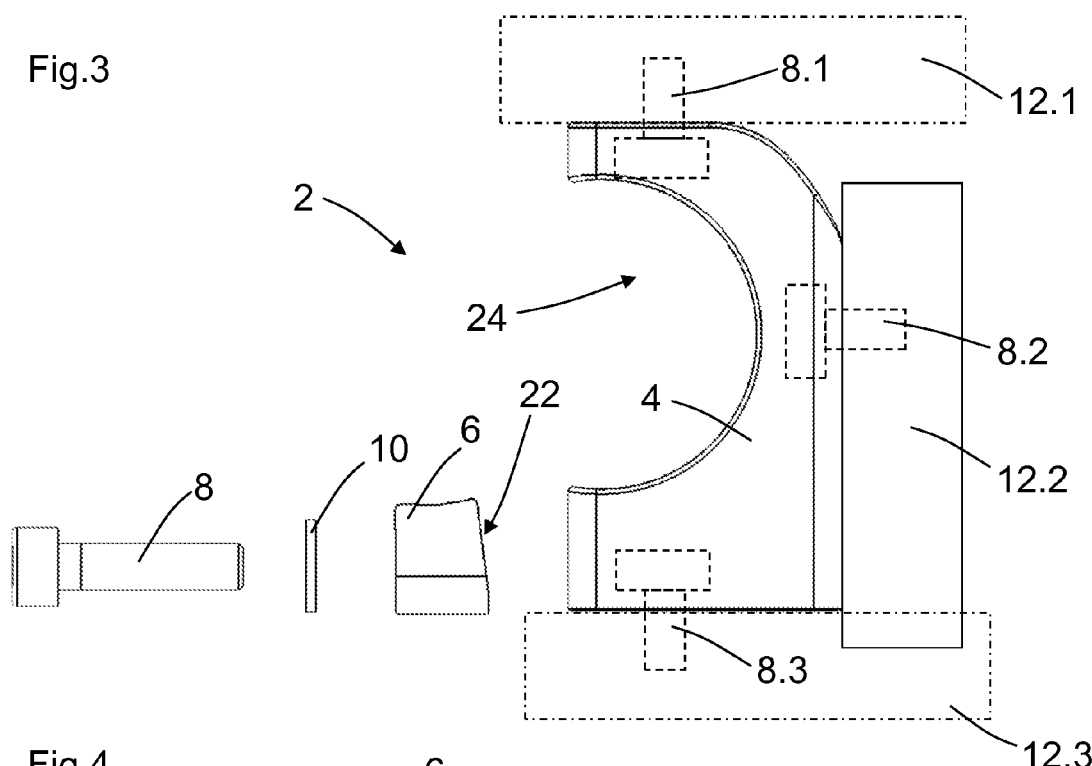
Figure 4:
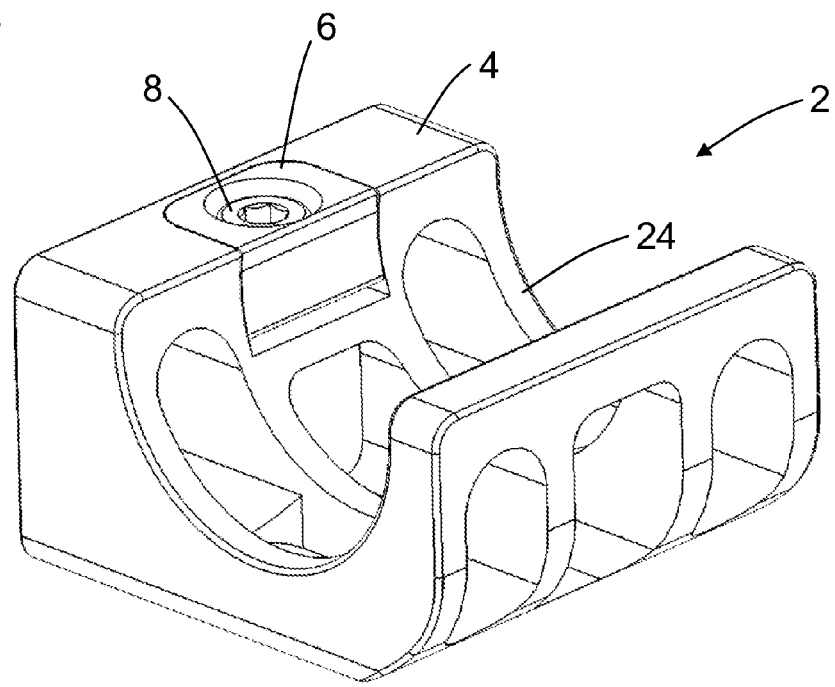
Figure 5:
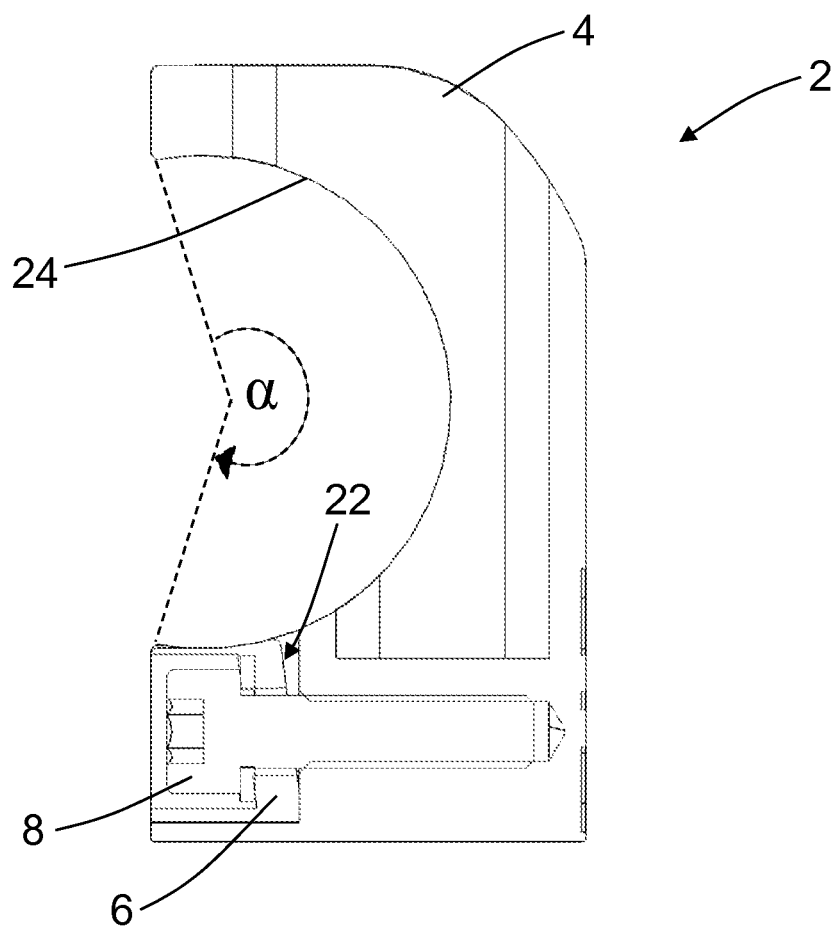
Figure 6:
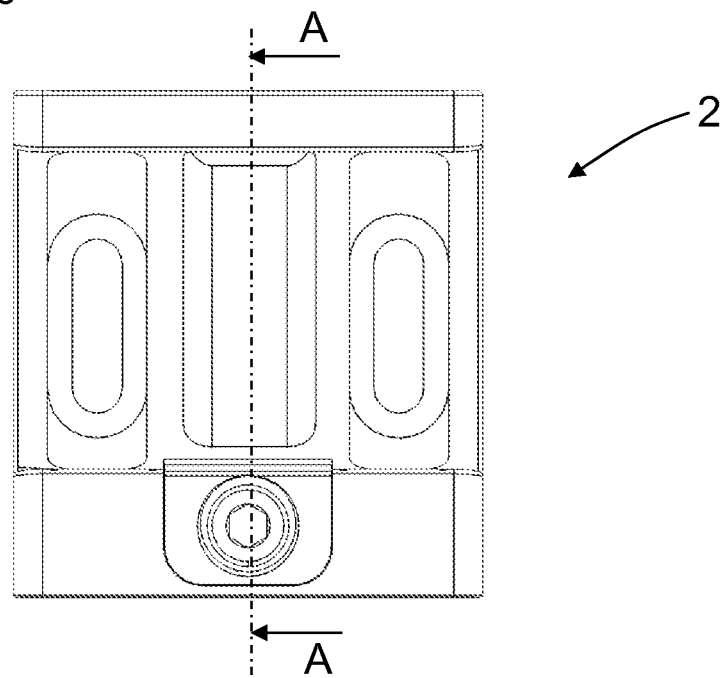

There are shown in the drawing:

FIG. 1 a fastening apparatus in accordance with the invention for fastening a light grid housing;

FIG. 2 a fastening apparatus in an exploded view;

FIG. 3 a fastening apparatus at an assembly body;

FIG. 4 a fastening apparatus in a perspective view;

FIGS. 5 and 6 a fastening apparatus in a sectional representation; and

FIG. 7 to FIG. 9 a method of assembling a light grid housing.

In the following Figures, the same parts are marked by the same reference numerals.

FIG. 1 shows a light grid having an electrical connection 18. This light grid has a light grid housing 1 which substantially comprises an elongated hollow section in whose interior optics and electronic components such as at least one light transmitter and/or at least one light receiver is/are arranged. The light grid housing 1 therefore has at one side a front screen 16 which is permeable for the light transmitted by the light transmitters and to be received by the light receivers and through which the light can exit the light grid housing 1 or can enter into the light grid housing 1. The light grid housing 1 is closed by end caps 20 at its respective short-side ends. The number of light transmitters and/or light receivers can in this respect amount to 1 to approximately 240, for example.

FIG. 1 furthermore shows a fastening apparatus 2 having a base part 4 for fastening and/or adjusting the light grid housing 1 having a partly round housing cross-section in a housing section at an assembly body 12, wherein the base part 4 has an open receiver for the light grid housing 1, wherein the round receiver forms a circular section 30 in cross-section and the circular section has an angle α of more than 180 degrees, wherein the light grid is arranged in the receiver and is held by the receiver by force transmission.

FIG. 2 shows a fastening apparatus in accordance with the invention in an exploded representation with the parts base part 4, clamping part 6, screw 8 and optional washer 10. The base part has the open receiver for the light grid housing. The circular section 30 has an angle α of more than 180 degrees in the cross-section of the open receiver 24. The base part has a receiver 26 for the clamping part 6. The clamping part is fastened in the base part with the aid of the screw 8. Optionally, a washer 10 is inserted between the screw and the clamping part for a better fastening.

The base part has a plurality of fastening openings 28 which are perpendicular to one another and which allow an alternative fastening of the base part to the assembly body, with the assembly of the base part being able to take place in two directions perpendicular to one another.

In FIG. 3, the different fastening possibilities of the base part are shown in different directions at different assembly bodies. For example, the base part can be assembled in a first direction at the assembly body 12.1 using the screw 8.1. Alternatively to this, it is, however, also possible to assemble the base part to the assembly body 12.2 using the screw 8.2, wherein the fastening direction is perpendicular to the first fastening using the screw 8.1. It is furthermore alternatively possible to assemble the base part to the assembly part 12.3 with the aid of the screw 8.3, wherein the assembly direction is opposite to the assembly direction with the screw 8.1. It would furthermore also be conceivable to provide further fastening openings perpendicular to the screws 8.1 to 8.2 to provide a fastening at all sides, apart from the side with the open receiver for the light grid housing, a fastening with the assembly body.

The clamping part 6 is shown in detail in FIG. 3. The clamping part 6 has a slanted surface 22 at its lower side which faces toward the base part. The slanted surface 22 is configured such that the clamping part 6 is shorter at the side toward the open receiver than the side disposed opposite it. The clamping part 6 is thereby tilted on the screwing into the base part 4 in the direction of the open receiver and thus in the direction of the light grid housing so that the light grid housing is clamped in the base part 4 by the clamping part 6. The light grid housing can thereby be finally positioned in its end position in the base part 4 after the light grid housing has been adjusted.

FIG. 4 shows the fastening apparatus 2 in the assembled state with the base part 4, clamping part 6 and screw 8. The clamping part 6 in this respect is integrated into the base part such that the clamping part 6 does not project into the open receiver of the base part, but has the same shape in the part section.

FIG. 5 shows a section through the assembled fastening apparatus in accordance with FIG. 4 along a section line A-A in accordance with FIG. 6. In FIG. 5, the round receiver having a cross-section 30 having an angle α of more than 180 degrees is shown. The slanted surface 22 of the clamping part is furthermore shown.

FIG. 7 shows the method of fastening and/or adjusting the light grid housing 1 having the partly round housing cross-section 34 in a housing section having the base part 4 at the assembly body 12, wherein the base part 4 forms a circular section (30) in cross-section by means of the open receiver and the circular section receives the light grid housing 2 at an angle .alpha. of more than 180 degrees, wherein the light grid housing is arranged in the receiver in that the light grid housing is introduced into the receiver of the base part in a first orientation and is rotated in accordance with FIG. 8 by 90 .degree. in the arrow direction in the receiver and is held by the receiver by force transmission in accordance with FIG. 9. An angle scale 36 is arranged at the end face of the base part 4 to adjust the light grid housing. A specific rotary position, set to a specific angle at the angle scale 36, can be read off with the aid of a position mark 38 at the light grid housing 1 and can be set exactly again at any time, for example on a replacement of the light grid housing 1.

REFERENCE NUMERALS 1 light grid housing
2 fastening apparatus
4 base part
6 clamping part
8 screw
10 washer
12 assembly body
14 housing
16 front screen
18 connection
20 end caps
22 slanted surface
24 open receiver
26 receiver
28 fastening openings
30 circular section
32 rectangular region
34 partly round housing cross-section
36 angle scale
38 position mark
α angle

The invention claimed is:

1. A method of fastening and/or adjusting a light grid housing (1) having a partly round housing cross-section (34) in a housing section having a base part (4) at an assembly body (12), the method comprising the steps of:
   receiving the light grid housing (1) in the base part (4) of an open receiver, wherein the receiver (24) forms a circular section (30) in cross-section and the circular section (30) has an angle (a) of more than 180 degrees,
   arranging the light grid housing (1) in the receiver (24) in that the light grid housing (1) is introduced into the receiver (24) of the base part (4) in a first orientation and is rotated 90° in the receiver (26), wherein the receiver (24) of the base part (4) is slightly smaller than the partly round housing cross-section (34) of the housing section and the light grid housing is held by force-transmission by the receiver (24).

2. The method in accordance with claim 1, further comprising the step of fastening a clamping part (6) to the base part (4) by using a screw (8).

3. The method in accordance with claim 1, further comprising the step of fastening the base part (4) to the assembly body (12) alternatively in two mutually perpendicular directions via fastening openings (2) provided at or in the base part (4) which openings are perpendicular to one another for the fastening.

4. The method in accordance with claim 1, wherein the light grid housing has a rectangular region (32) which acts as an abutment and/or as a position mark at the base part (4) in the longitudinal direction of the light grid housing (1).

5. The method in accordance with claim 1, further comprising the step of adjusting the light grid housing (1) with the aid of an angle scale (36) on an end face of the base part (4).

* * * * *